Feb. 22, 1944.  C. G. DOWD ET AL  2,342,127
SPARE TIRE CARRIER
Filed Aug. 1, 1941  3 Sheets-Sheet 1
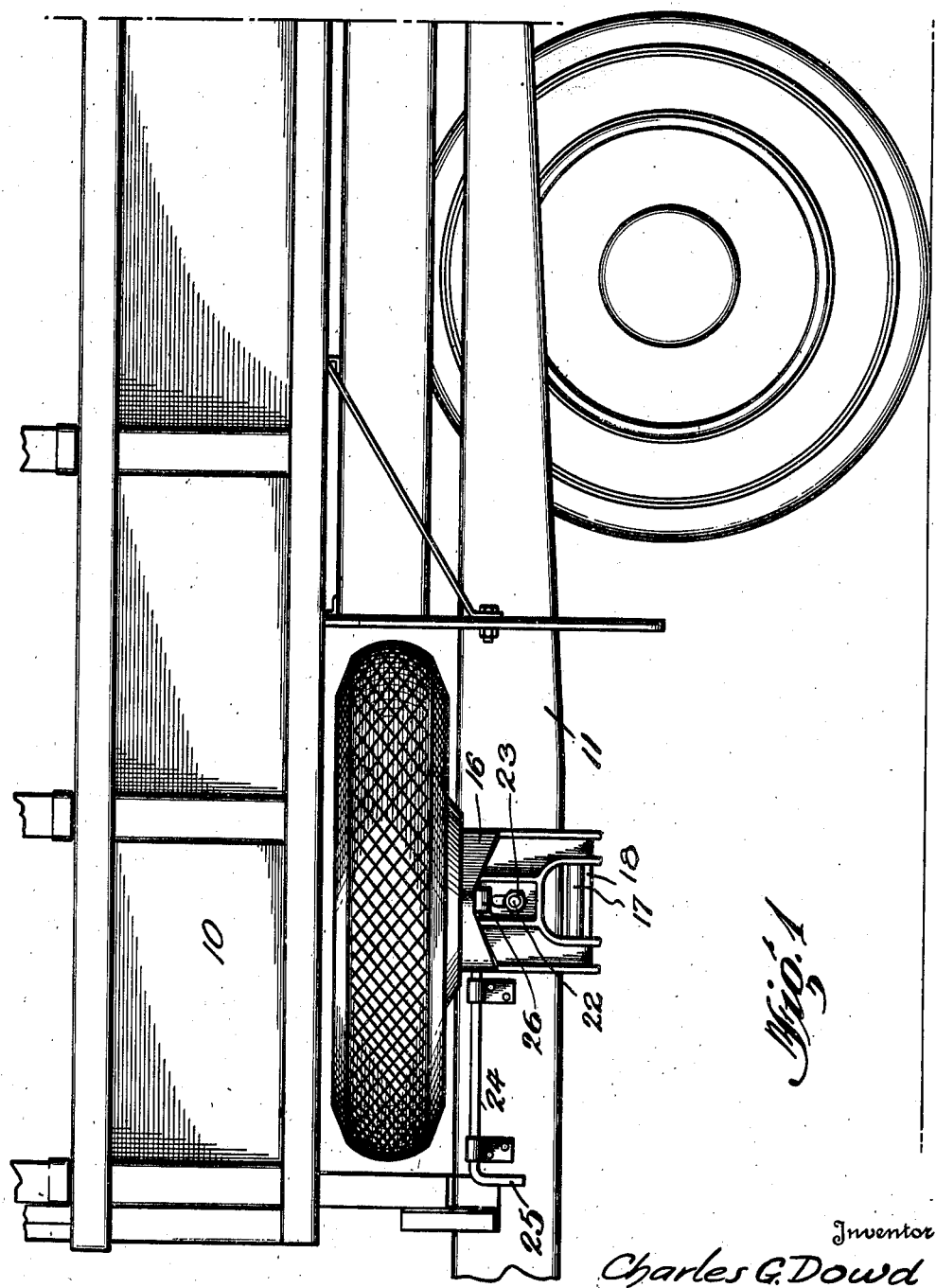
Inventors
Charles G. Dowd
George P. Engler
By
Attorney

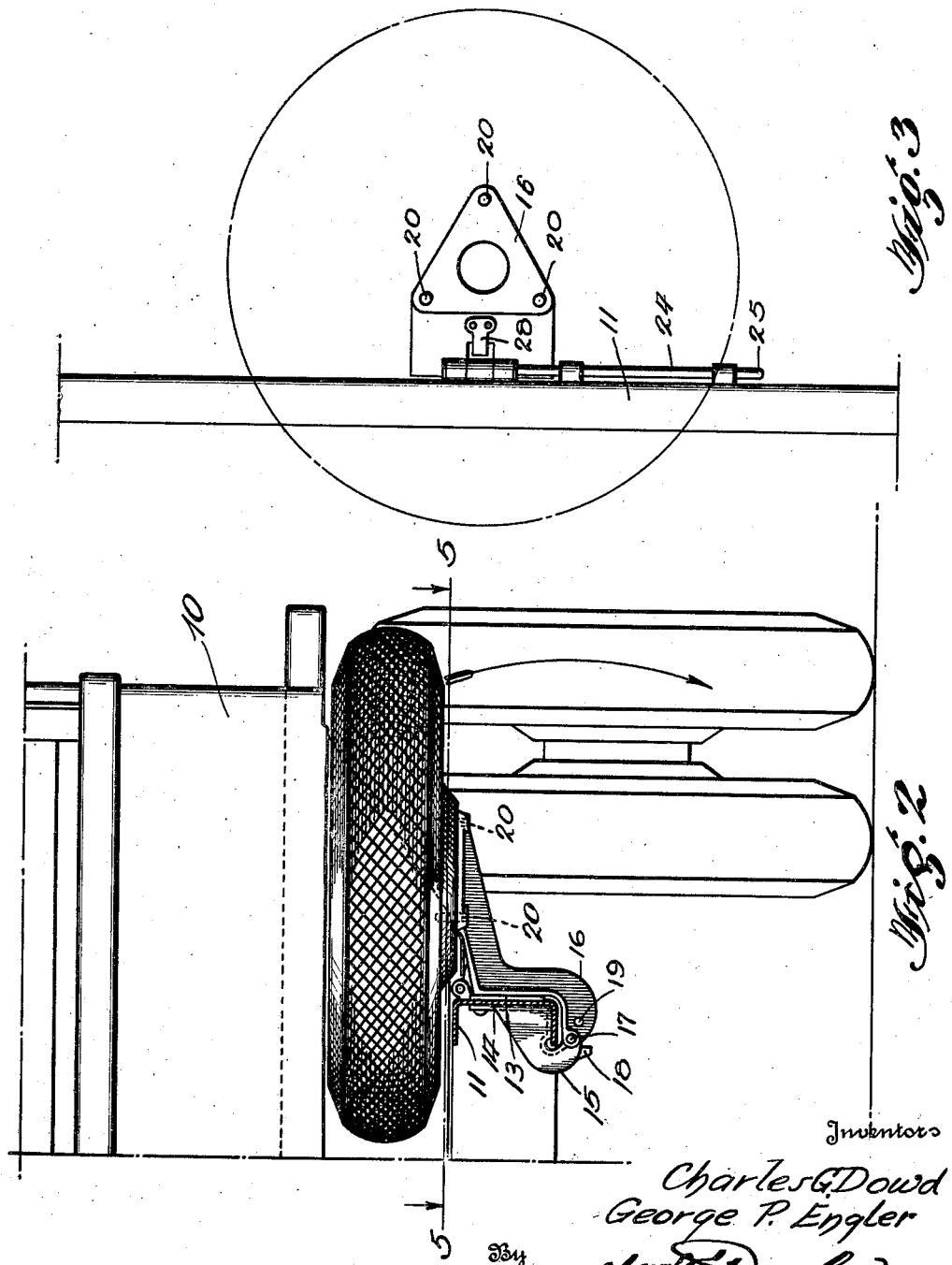

Feb. 22, 1944.  C. G. DOWD ET AL  2,342,127
SPARE TIRE CARRIER
Filed Aug. 1, 1941  3 Sheets-Sheet 3
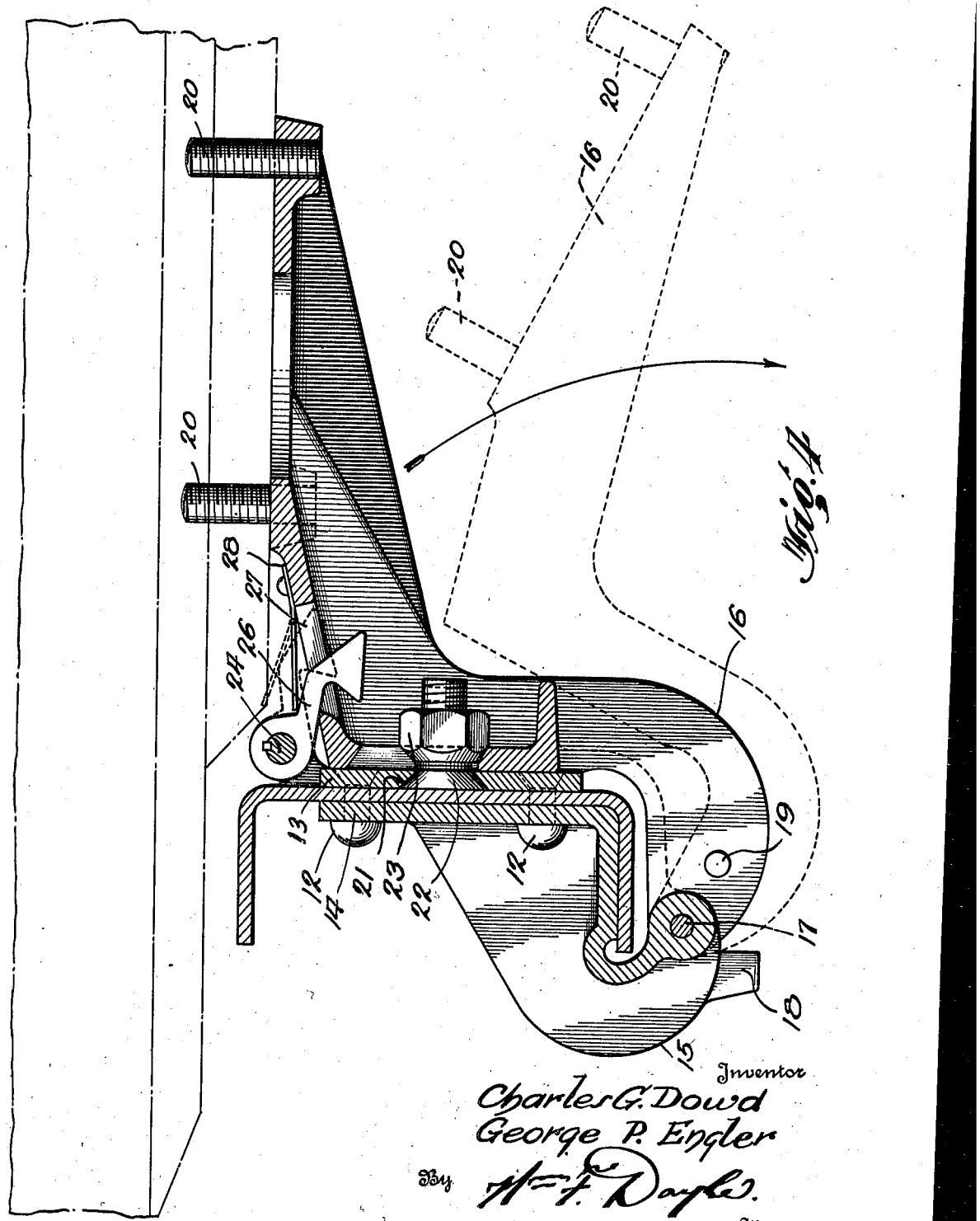

Patented Feb. 22, 1944

2,342,127

UNITED STATES PATENT OFFICE 2,342,127

SPARE TIRE CARRIER

Charles G. Dowd and George P. Engler, Baltimore, Md.

Application August 1, 1941, Serial No. 405,049

7 Claims. (Cl. 224—29)

(Granted under the act of March 3, 1883, as amended April 30, 1928; 370 O. G. 757)

The invention described herein, if patented, may be manufactured and used by or for the Government for Governmental purposes without the payment of any royalty thereon.

This invention relates to and has for a purpose the provision of a spare tire carrier, particularly adapted for use on motor vehicles, and is especially adapted to completely store the spare tire in an elevated horizontal position beneath the body of the vehicle, where it will be out of the way and yet readily accessible.

Vehicles that are required to travel over rough terrain, especially ordnance vehicles, must have ample ground clearance, particularly at the ends in order to provide a proper angle of approach and angle of departure. The principal object of this invention is to provide a tire or wheel carrier in which these requirements are satisfied. Accordingly, the carrier is mounted at some distance from the ends of the vehicle, preferably between the front and the rear wheels, and in such manner that the spare tire is carried in a relatively high position or very close to the bottom of the vehicle body. The carrier is pivotally mounted on one of the longitudinal frame members of the vehicle and is of such peculiar shape as to permit the spare tire and a pivoted part of the carrier to be swung downwardly without requiring substantial clearance between the upper surface of the horizontally supported tire and the bottom of the vehicle body.

With the above and other objects and advantages in view, the invention consists of features of construction, arrangement and operation of parts which will appear in the specification and be finally pointed out in the claims.

While a preferred embodiment of the invention is shown, it will be understood that slight changes in form and minor details of construction may be resorted to without departing from the spirit of the invention and fall beyond the scope of the claims.

Referring now to the drawings in which similar characters and references in the several figures indicate identical parts.

Fig. 1 is a view of the carrier in front elevation, a spare tire wheel being shown in carrying position.

Fig. 2 is a side elevation of the carrier, a spare tire and wheel being shown in carrying position.

Fig. 3 is a top plan view taken along lines 5—5 of Fig. 2, showing a preferred but not necessarily the only embodiment of the invention as applied to the vehicle chassis.

Fig. 4 is an enlarged sectional side view showing the carrier in use and also showing in dotted lines the manner in which the device opens up.

Reference now being had to the drawings by numerals, 10 indicates a motor vehicle, the chassis thereof being exemplified by the channel beam 11 having rigidly secured thereto by means of rivets 12, plate members 13 and 14. Plate member 14 conforms to the contour of the inside of the channel beam 11. The member 14 has its rearward portion bent forward as shown at 15 so as to receive the pivoted carrier bracket 16 thereon. The pivot pin or bolt 17 interconnects the members 14 and 16 in the manner shown. The extension 18 on plate member 14 provides a rest for the stop member 19 on the carrier bracket 16. The extension 18 and stop 19 prevent the pivoted carrier bracket 16 from swinging out of position into the chassis when the wheel is applied.

The carrier bracket 16 is provided with several lugs 20, which are adapted to enter the well-known openings in the wheel on which the spare tire is mounted, thereby providing means for suitably securing the wheel and spare tire to the carrier bracket 16. Plate member 13 is provided with an opening 21 in which is secured the bolt 22 whereby the pivoted carrier bracket is rigidly held or secured in position by means of the nut 23 which is adapted to be secured on to the bolt 22. The bolt 22 has the end thereof drilled to accommodate a lock, not shown.

Pivotally mounted on plate 13 is the ratchet release lever 24 which is bent at right angles at its forward end to provide the hand-fold or handle 25. The ratchet or latch member 26 is securely keyed to the ratchet release lever 24 and is adapted to enter the opening 27 in the carrier bracket 16. A suitable spring 28 of type and tension to control the ratchet or latch member is located on carrier bracket 16 by well-known means such as bolts, etc. This spring 28 tends to keep the ratchet or latch member within the opening 27 until released by means of the ratchet release lever 24.

When it is desired to place a spare tire and wheel on the spare tire carrier, the pivoted carrier bracket will be lowered as indicated by dotted lines in Fig. 4, and while this member is in such lowered position the wheel on which the spare tire is mounted will be placed in position so that the openings therein will align themselves with the lugs 20 on the pivoted carrier bracket 16. The wheel can then be secured to the carrier bracket 16 by nuts and then raised or lifted into the position shown in Figs. 1 and 2. When in this position the ratchet or latch member 26 will enter the opening 27 and the nut 23 can be tightened on the bolt 22, thereby securely holding the spare tire in fixed position. When it is desired to remove the spare tire the nut 23 will be removed and by rotating the lever handle 25 to release the ratchet or latch member 26 from the opening 27 the tire can be lowered and removed from the carrier.

The invention exemplifies a carrier by which a spare tire may be carried horizontally under the body of the vehicle and which is movable to provide ready access to the tire so that it can be easily removed from and replaced on the carrier.

The position in which the spare tire is supported, as shown more clearly in Figure 2, affords several advantages. Since the tire is carried above the frame member 11, the carrier may be positioned between the front and rear wheels of the vehicle without interfering with the propeller shaft housing or other parts of the structure. In other words the invention provides an underslung tire carrier that need not utilize the free spaces at the ends of the vehicle. These spaces, while clear, should not be obstructed in vehicles that must travel over rough terrain having slopes or protuberances that would be struck by objects carried in the spaces.

The invention is not to be understood as restricted to the details set forth, since these may be modified within the scopes of the appended claims without departing from the spirit and scope of the invention.

Having thus described the invention, what is claimed as new and desired to secure by Letters Patent is:

1. A tire carrier comprising, in combination with a longitudinal frame member of a vehicle, a supporting member having a portion positioned beneath said frame member; a bracket pivotally attached to said portion and extending upwardly along said frame member and laterally from the upper portion of said frame member, detachable means for locking said bracket against downward pivotal movement, and means on the laterally extending portion of said bracket for attachment to a wheel.

2. A tire carrier comprising, in combination with a longitudinal frame member of a vehicle, a supporting member having a portion positioned beneath said frame member, a bracket pivotally attached to said portion and extending upwardly along the outward surface of said frame member and laterally from the upper portion of said frame member, detachable means for locking said bracket against downward pivotal movement, and means on the laterally extending portion of said bracket for attachment to a wheel.

3. A tire carrier comprising, in combination with a longitudinal frame member of a vehicle, a supporting member having a portion positioned beneath said frame member, a bracket pivotally attached to said portion and extending upwardly along said frame member and laterally from the upper portion of said frame member, detachable means for locking said bracket against downward pivotal movement, and means on the laterally extending portion of said bracket for attachment in concentric relation to a spare tire, the horizontal distance from said frame member to the center of said attaching means being substantially less than the maximum radius of said tire, whereby said tire overlies said frame member.

4. A tire carrier comprising, in combination with a longitudinal frame member of a vehicle, a supporting member having a portion positioned beneath said frame member, a bracket pivotally attached to said portion and extending upwardly along the outward surface of said frame member and laterally from the upper portion of said frame member, detachable means for locking said bracket against downward pivotal movement, and means on the laterally extending portion of said bracket for attachment in concentric relation to a spare tire, the horizontal distance from said frame member to the center of said attaching means being substantially less than the maximum radius of said tire, whereby said tire overlies said frame member.

5. A tire carrier comprising, in combination with a longitudinal frame member of a vehicle, a supporting member fastened to said frame member and having a portion disposed below said frame member, a bracket pivotally attached to said portion and extending upwardly along said frame member and laterally from the upper portion of said frame member, detachable means for locking said bracket against downward pivotal movement, and means on the laterally extending portion of said bracket for attachment to a wheel.

6. A tire carrier comprising, in combination with a longitudinal frame member of a vehicle, a supporting member fastened to said frame member and having a portion disposed below said frame member, a bracket pivotally attached to said portion and extending upwardly along said frame member and laterally from the upper portion of said frame member, detachable means for locking said bracket against downward pivotal movement, and means on the laterally extending portion of said bracket for attachment in concentric relation to a spare tire, the horizontal distance from said frame member to the center of said attaching means being substantially less than the maximum radius of said tire, whereby said tire overlies said frame member.

7. A tire carrier comprising a supporting member adapted for attachment to a frame member of a vehicle and having a portion adapted to extend beneath such frame member; a bracket pivotally attached to said portion and extending upwardly and laterally therefrom, detachable means for locking said bracket against downward pivotal movement, and means on the laterally extending portion of said bracket for attachment to a wheel.

CHARLES G. DOWD.
GEORGE P. ENGLER.